Aug. 13, 1946.    F. L. MELVILL    2,405,593
PACKING FOR VAPOR AND LIQUID CONTACTING APPARATUS
Filed Feb. 4, 1944
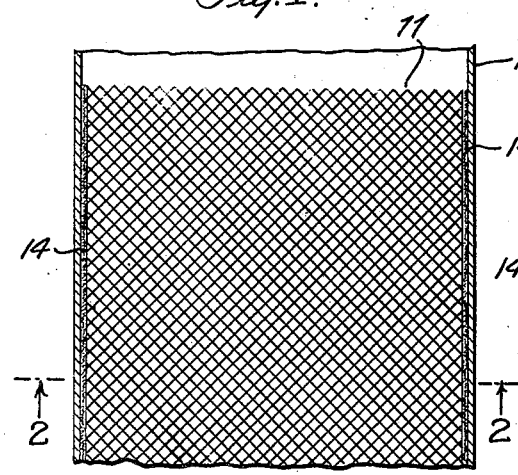
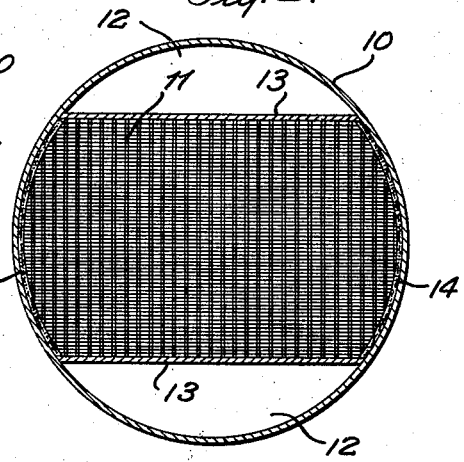
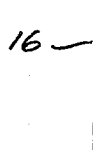
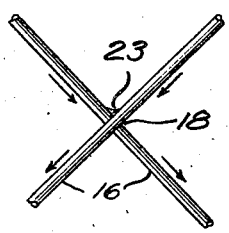
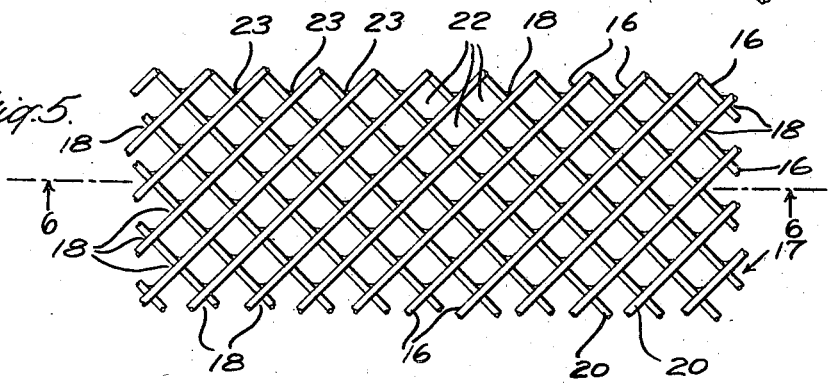
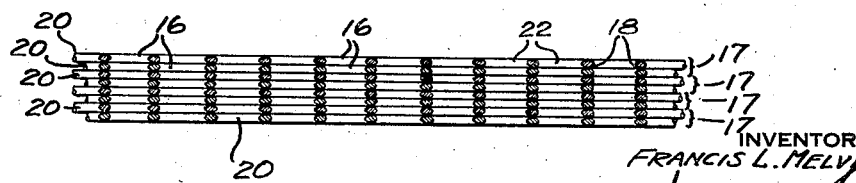
INVENTOR
FRANCIS L. MELVILL
BY
ATTORNEY Patented Aug. 13, 1946

2,405,593

UNITED STATES PATENT OFFICE 2,405,593

PACKING FOR VAPOR AND LIQUID CONTACTING APPARATUS

Francis L. Melvill, New York, N. Y.

Application February 4, 1944, Serial No. 521,049

7 Claims. (Cl. 261—94)

This invention relates to packing for gas or vapor and liquid contacting apparatus. Although the invention has a wide range of utility, it is particularly useful in connection with contacting apparatus employed for the absorption, cooling, drying, cleansing or humidifying of gases, for the evaporation, cooling or heating of liquids, or for reaction purposes. Such apparatus may, for example, take the form of fractionating towers, scrubbers, cooling towers and the like. In such apparatus, a packing is usually employed for effecting intimate contact between the descending liquid and the ascending gas or vapor. As used herein and in the claims, the term "gas" includes vapor within its scope.

The invention provides a novel packing for gas and liquid contacting apparatus which avoids the presence of unequal gas or liquid passages and prevents channeling or segregation of the flowing gas in open spaces and of the liquid along surface areas, with the result that at any cross-section of the packing at right angles to the general direction of countercurrent flow of the liquid and gas, the composition of the liquid and gas are substantially uniform.

The invention also provides a new and improved packing of the general character described, which feeds and spreads out the liquid evenly in a thin film and in a regular predetermined symmetrical manner as it descends in a treating chamber, so that even distribution of the liquid throughout the flow area of the chamber is afforded, which provides the maximum of effective (i. e., wetted) surface area per unit of packing space, offers a minimum of resistance to the passage of the ascending gas, and affords a maximum of intimacy of contact and interaction between liquid and gas, so that equilibrium between the fluid in either phase immediately adjacent to the inter-face and the main bulk of the fluid comprising the phase is rapidly attained.

The invention further provides a packing of the general character described, which comprises a series of simple, comparatively inexpensive elements requiring little or no shaping, and which can be easily and expeditiously assembled.

In carrying out the features of the invention, packing elements of small cross-section and desirably in the form of rods, wires or tubes, are arranged to form a network of predetermined pattern, and to define courses along which the liquid is directed in the form of thin exposed streams encircling the elements. The packing elements are desirably straight and are latticed or criss-crossed to form a series of intersections or points of contact which are regularly and symmetrically arranged in vertical staggered rows, and which define liquid mixing and distributing zones. The streams of liquid flowing along the downwardly converging packing elements respectively merge and intermix at the intersections of these elements, and then subdivide into corresponding streams as they flow along the elements diverging from said intersections. The liquid flowing down a single element of the packing is regularly mixed with liquid flowing down an adjacent element of the packing, and the resulting mixture is then redistributed among elements diverging from the mixing zone, each of these redistributed streams carrying substantially the same aliquot part of the liquid reaching the mixing zone from above.

The nature of the invention will be apparent from the following description when considered in connection with the accompanying drawing forming a part thereof, and in which:

Fig. 1 is a fragmentary axial vertical section, somewhat diagrammatic, of a gas and liquid contacting device containing a packing embodying the invention;

Fig. 2 is a transverse section, somewhat diagrammatic, of the contacting device, taken on line 2—2 of Fig. 1;

Fig. 3 is a view in elevation of one of the packing elements prior to assembly;

Fig. 4 is a view in elevation showing a pair of packing elements assembled to form an intersecting liquid mixing and distributing zone;

Fig. 5 is a view in elevation of a portion of the packing of Figs. 1 and 2, but shown on a larger scale; and Fig. 6 is a horizontal section of the packing taken on line 6—6 of Fig. 5.

Referring to Figs. 1 and 2 of the drawing, the gas and liquid contacting device is shown comprising a vertical cylindrical column or tower 10 containing the packing 11 of the invention. The gas to be contacted is delivered to the lower portion of the tower 10 below the packing 11, and flows upwardly through the packing, while liquid is fed to the upper portion of the tower above the packing, and flows downwardly through the packing in thin streams and in intimate contact with the ascending gas in a manner to be described. The liquid is desirably delivered to the upper portion of the tower 10 and over the packing 11 in such scattered form as to be spread substantially evenly over the top of the packing 11, so that the liquid is distributed substantially uniformly throughout the packing at its upper end. For that purpose, the liquid may be delivered over the packing 11 in spray form, or may be delivered by a liquid feed device similar to that shown and described in my copending application Serial No. 536,306, filed May 19, 1944, to feed the liquid in predetermined equally spaced thin streams over the packing.

The packing 11 is shown occupying the central portion of the tower 10, while the diametrically opposite side chordal sections 12 of the tower are left vacant or unpacked. A pair of partition plates 13 on the straight or chordal sides respectively of the packing 11, prevent flow into or out of the packing through the sides. The unpacked spaces 12 of the tower 10 may be sealed either at the bottom or the top in any manner well-known in the art to prevent by-pass flow through these spaces. The clearance between the arcuate peripheral portions of the packing 11 and the corresponding wall of the tower 10 may be sealed by any suitable means, as for example by means of layers 14 of glass wool.

As a feature of the invention, the packing 11 comprises a series of slender elements 16 which may be in the form of wires, tubes, flat strips or the like, and which are shown specifically as solid cylindrical rods. These packing elements 16 are identical in transverse cross-sectional size and shape, and their surfaces are of such material and finish as to be substantially wetted by the liquid under normal operating conditions. For that purpose, the packing elements 16 are desirably of material having the necessary finish to afford the required wetting properties. These packing elements 16 are of sufficient diameter so that they will have substantial rigidity. For example, packing elements one-tenth of an inch in diameter will be satisfactory, although larger or smaller sizes may be desirable depending upon the circumstances of use of the packing.

Although the packing elements 16 are shown in cylindrical form, as far as certain aspects of the invention are concerned, they may be of any suitable symmetrical cross-sectional shape. For example, the surface of the elements 16 may be grooved, fluted or otherwise treated to form a regular pattern thereon. The grooves may extend parallel to the longitudinal axis of the elements 16, or may extend helically or in the form of a thread. Such surface grooving of the elements 16 may be provided to increase the liquid carrying capacity of the rods. Also, instead of using single rods, wires or the like, as far as certain aspects of the invention are concerned each of the packing elements 16 may consist of multiple wires braided or helically twisted together, or laid side by side.

The packing elements 16 are arranged to form a plurality of vertical units or sheets 17 in face to face contact, each comprising a series of elements criss-crossed to define a plurality of liquid mixing and distributing junction zones 18. In the specific form of the invention shown, each vertical packing sheet 17 comprises two interfacing layers 20 of packing elements arranged in criss-cross fashion. The elements 16 of one layer 20 in a packing sheet 17 are equally spaced and arranged obliquely in parallel in one vertical plane, and the elements of the other layer of the packing sheet are spaced the same distance apart and are similarly arranged obliquely in parallel in a vertical plane, but extend in oblique directions reverse to those of the elements of the first layers but at the same inclination with the vertical. The two layers 20 of elements 16 of each packing sheet 17 are interconnected to form a sheet unit, as will be more fully set forth, and are latticed as described to define a series of quadrilateral staggered meshes 22 large enough to prevent capillary filming of the down flowing liquid across the meshes, but preferably as small as possible having regard for the liquid gas load. The adjoining sections of the elements 16 forming the two upper sides of each mesh 22 are of equal length, and the adjoining sections of the elements forming the two lower sides of each mesh are also of equal length, and are desirably of the same length as the two upper element sections. The meshes 22 are advantageously in the form of equilateral parallelograms, and are specifically shown as square in shape. The meshes 22 of each packing sheet 17 are arranged in vertical rows with the vertices 18 of the meshes of each row in vertical alignment, and the meshes of adjoining vertical rows medially staggered. This construction lends symmetry to the arrangement, and serves to assure a more uniform mixing and distribution of the liquid in its downward flow through the packing 11.

The elements 16 in the two criss-crossed layers 20 of each packing sheet 17 desirably are interconnected at the intersections 18 of said element preferably by welds 23. These welds 23 preferably are on the upper sides of the intersections 18 to prevent irregularities at the bottom of each intersection 18 which would be undesirable, since they might cause the liquid to flow therefrom in the form of droplets or to be distributed unequally. This would adversely affect the desired regularity in the distribution and flow of the liquid as will be more apparent hereinafter. It will be understood that any number of these welds 23 may be formed according to the overall size of the packing sheets 17 or the size of the packing elements. For example, the welds 23 may be formed at each intersection 18, or at spaced intervals.

The lengths of the packing elements 16 vary according to the overall size of the packing sheets 17, or the cross-sectional size of the elements. For example, in the smaller packing sheets, the elements 16 may be made to extend integrally from edge to edge of the sheet, while in the larger packing sheets, the elements, and especially the longer ones, may consist of different sections positioned in axial abutting alignment. These axially aligned elements 16 may be butt-welded together, if desired.

The packing sheets 17 as described are substantially identical as far as the size and shape of their meshes 22 and the diameter of their elements 16 are concerned, and are arranged vertically in lateral face to face contact with the elements of alternate layers 20 running in the same oblique direction, to form the composite packing 11. These packing sheets 17 desirably are so arranged that the meshes 22 of one sheet are in horizontal registry with the meshes of the other sheets, as shown in Figs. 5 and 6. However, as far as certain aspects of the invention are concerned, the packing sheets 17 may be relatively displaced vertically, so that the meshes 22 of one packing sheet 17 are out of phase with the meshes of adjoining sheets. For example, the meshes 22 of alternate packing sheets 17 may be in horizontal registry, while the meshes of intervening packing sheets may be in horizontal registry but medially displaced with respect to the meshes of the other sheets. In this latter arrangement, the vertices of the meshes 22 of one packing sheet 17 would be disposed centrally with respect to the meshes of adjoining sheets.

The packing sheets 17 may be interconnected together, or may be relatively displaceable vertically. This latter arrangement may be preferred, where for example, it is desirable to vibrate some of the sheets 17 edgewise with respect to others to promote turbulence in the fluid flow or to prevent clogging of the packing.

In the use of the packing 11, the liquid with which it is desired to contact the ascending gases is delivered to the top section of the packing as described, and is divided into a number of predetermined exposed streams which flow obliquely downwardly along the elements 16 in regular zigzag courses. The liquid flows substantially evenly in a series of thin films over the surfaces of the packing elements in a direction generally counter to the direction of flow of the gas. The maximum of liquid surface thereby is exposed to the action of the ascending gas. The liquid stream flowing down along a single element 16 of the packing 11 merges at a juncture 18 with the liquid stream flowing down an adjoining element. At this juncture 18, the two streams are thoroughly intermixed, and the resulting mixture is then subdivided and redistributed equally between the elements diverging downwardly from the juncture. Each of these diverging elements constitutes part of another pair of elements converging towards a juncture 18, so that the two diverging distributed streams merge and intermix with other adjoining streams, and then again become subdivided. This process is repeated so that uniform mixing and distribution of the liquid in thin films throughout the width of each packing sheet 17 is assured. Also, since the packing sheets 17 are in lateral face to face contact, the liquid in one sheet is not only distributed and mixed substantially uniformly throughout the width of the sheet, but is also distributed and intermixed with the liquid of adjoining packing sheets. In this manner, substantially uniform mixing and distribution of the liquid throughout the entire horizontal section of the packing 11 is assured.

If the flow along the various elements 16 is not equal, the degree of inequality will tend to become progressively reduced due to the fact that each element will divide, or will tend to divide, the whole of the liquid reaching a given mixing zone 18 equally with its element partner in that zone. This is particularly important in the upper section of the packing 11, where the liquid feed may not be deposited uniformly over the top of the packing. By the equalizing process described, the distribution of the liquid under these conditions will become uniform in the upper section of the packing 11. Uniform distribution of the liquid when once attained near the top of the packing 11 will persist to the bottom thereof. The gas flows generally upwardly and tortuously through the meshes 22 countercurrent to the liquid and contacts the exposed thin liquid films on the packing elements 16. The disposition of the meshes 22 insures the necessary turbulence to secure thorough mixing, thus avoiding the loss of efficiency which results when gas at the liquid-gas interface is not mixed as rapidly as possible with the main bulk of the gas, and when other purely local conditions within the packing 11 tend to vary the composition of the gas across any section of the tower 10. The velocity of the gas upwardly will be substantially the same at any point in any plane at right angles to the general direction of flow. Maximum intimacy of contact and maximum interaction between liquid and gas is obtained, and equilibrium is rapidly established between the material in either vapor or liquid phase immediately adjacent to the interface and the main bulk of the material comprising the phase.

On any cross-section of the packing 11 at right angles to the general direction of flow of the liquid and gas the composition of the gas is substantially the same and the composition of the liquid in its constituent streams is substantially the same. The pressure drop of the liquid passing through the packing 11 and the amount of liquid retained by the packing under normal operating conditions is comparatively low. A comparatively long path of travel of the liquid passing through the packing 11 is provided so that retention of the liquid for a period long enough to assure the necessary saturation or interaction with the gas is assured.

Inasmuch as each of the elements extends in a downwardly inclined direction from the inner wall of the tower 10, liquid which reaches the wall by way of some of the elements will flow away from the wall by way of other elements and thus will tend to retain the liquid in the packing and prevent short circuiting flow down the wall of the tower.

The velocity of the vapor flowing upwardly through the packing will cause or tend to cause the liquid on the elements to assume a streamlined or tear drop shape such as would present the minimum resistance to the flow of vapors and this, together with the surface effects which become pronounced with thin films of liquid, will have the effect of distributing the liquid over the surfaces of the elements with a tendency for a major part of the liquid to flow down the upper parts of the elements, the amount of liquid so flowing increasing with increased vapor velocity. The effect of this is to insure the maximum exposure of the liquid to the vapor and to facilitate the mixing of the streams of liquid at the juncture points 18.

Since many changes can be made in the apparatus disclosed, and many apparently widely different embodiments of the invention can be made without departing from the scope of the claims, it is intended that all matter contained in the above description or shown in the accompanying drawing shall be interpreted as illustrative and not in a limiting sense.

What is claimed is:

1. In gas and liquid contacting apparatus comprising a column with a liquid inlet and a gas outlet in the upper part thereof and a gas inlet and liquid outlet in the lower part thereof, said column being adapted for countercurrent flow, a packing for the column comprising a plurality of vertically extending sheets disposed in the path of flow of said gas through the column, each sheet comprising straight slender elements which are vertically inclined and in contact, the elements being arranged to form a plurality of mixing zones comprising a series of intersections in spaced horizontal and spaced vertical rows, said rows and said intersections being closely spaced, the distance therebetween being sufficient to form spaces between the intersections large enough to prevent capillary filming of the liquid thereacross.

2. In gas and liquid contacting apparatus comprising a column with a liquid inlet and a gas outlet in the upper part thereof and a gas inlet and liquid outlet in the lower part thereof, said column being adapted for countercurrent flow, a packing for the column comprising a plurality of vertically extending sheets disposed in face to face contact and in the path of flow of said gas through the column, each sheet comprising straight slender elements which are vertically inclined and in contact, the elements being arranged to form a plurality of mixing zones comprising a series of intersections in spaced horizontal and spaced vertical rows, said rows and said intersections being closely spaced, the distance therebetween being sufficient to form spaces between the intersections large enough to prevent capillary filming of the liquid thereacross.

3. In gas and liquid contacting apparatus comprising a column with a liquid inlet and a gas outlet in the upper part thereof and a gas inlet and liquid outlet in the lower part thereof, said column being adapted for countercurrent flow, a packing for the column comprising a plurality of vertically extending sheets disposed in face to face contact and in the path of flow of said gas through the column, each sheet comprising a network of straight slender elements which are vertically inclined and are regularly arranged and in contact to form definite rows of quadrilateral meshes, each having diagonally opposed junction corners substantially vertically aligned and defining liquid mixing and distributing zones respectively, the elements bounding each of said meshes diverging obliquely downwardly in pairs from the upper junction corner of said latter mesh at substantially equal angles with the vertical, and converging towards the lower junction corner of said last-mentioned mesh at substantially the same angle with respect to the vertical, said elements being so arranged that the mixing and distributing zones are closely spaced, the distance therebetween being sufficient to form meshes of a size to prevent capillary filming of the liquid thereacross.

4. In gas and liquid contacting apparatus comprising a column with a liquid inlet and a gas outlet in the upper part thereof and a gas inlet and liquid outlet in the lower part thereof, said column being adapted for countercurrent flow, a packing for the column comprising a plurality of vertically extending sheets disposed in face to face contact and in the path of flow of said gas through the column, each sheet comprising a network of obliquely extending slender elements which are vertically inclined and are regularly shaped and regularly criss-crossed to form definite vertical rows of equilateral quadrilateral meshes of substantially the same size and shape, having diagonally opposite vertices in substantially vertical alignment, the meshes of one vertical row being staggered with respect to the meshes of the adjoining vertical row, and arranged in lattice relationship therewith to define a series of junction zones towards which the elements converge in pairs obliquely downwardly and from which the elements diverge in pairs obliquely downwardly, at least some of said elements being in contact at the junction zones, said elements being so arranged that the junction zones are closely spaced, the distance therebetween being sufficient to form meshes of a size to prevent capillary filming of the liquid thereacross.

5. In gas and liquid contacting apparatus comprising a column with a liquid inlet and a gas outlet in the upper part thereof and a gas inlet and liquid outlet in the lower part thereof, said column being adapted for countercurrent flow, a packing for the column comprising a plurality of vertically extending sheets disposed in face to face contact and in the path of flow of said gas through the column, each sheet comprising a fabric of straight slender packing elements which are vertically inclined and are regularly arranged in accordance with a predetermined pattern to form a network provided with a plurality of vertically extending zig-zag sections having uniform alternate turns, and defining regular predetermined flow paths along which the liquid is adapted to flow in definite streams respectively, these sections being joined at staggered intervals to define mixing zones where the streams merge and then subdivide as they descend, said elements being so arranged that the mixing zones are closely spaced, the distance therebetween being sufficient to form meshes of a size to prevent capillary filming of the liquid thereacross.

6. In gas and liquid contacting apparatus comprising a column with a liquid inlet and a gas outlet in the upper part thereof and a gas inlet and liquid outlet in the lower part thereof, said column being adapted for countercurrent flow, a packing for the column comprising a plurality of vertically extending sheets disposed in face to face contact and in the path of flow of said gas through the column, each sheet comprising two or more criss-cross layers of slender packing elements of predetermined shape which are vertically inclined, the elements of each layer extending obliquely in the same general direction, and the elements of adjoining layers extending obliquely in transverse directions to form a series of liquid mixing and distributing intersection zones, at least some of said elements being in contact at said zones, said elements being so arranged that the liquid mixing and distributing intersection zones are closely spaced, the distance therebetween being sufficient to form meshes of a size to prevent capillary filming of the liquid thereacross.

7. In gas and liquid contacting apparatus comprising a column with a liquid inlet and a gas outlet in the upper part thereof and a gas inlet and liquid outlet in the lower part thereof, said column being adapted for countercurrent flow, a packing for the column comprising a plurality of vertically extending sheets disposed in face to face contact and in the path of flow of said gas through the column, each sheet comprising a plurality of straight elements which are vertically inclined and are regularly arranged to form a series of intersections defining liquid mixing and distributing zones, at least some of the intersecting elements being interconnected by welds formed on the upper portions of the intersections, while the lower portions of the intersections are free of welds, said elements being so arranged that the intersections are closely spaced, the distance therebetween being sufficient to form meshes of a size to prevent capillary filming of the liquid thereacross.

FRANCIS L. MELVILL.